United States Patent
Briski

[19]
[11] Patent Number: 5,947,348
[45] Date of Patent: Sep. 7, 1999

[54] BEVERAGE TAPPER SHUT-OFF MECHANISM

[76] Inventor: Richard J. Briski, 8889 Greenview La., Greendale, Wis. 53129

[21] Appl. No.: 08/946,539

[22] Filed: Oct. 7, 1997

[51] Int. Cl.[6] .............................. G04C 1/12; B67D 3/00
[52] U.S. Cl. .................... 222/640; 222/214; 222/504; 251/7; 251/129.2
[58] Field of Search .................... 222/504, 214, 222/640–641; 251/7, 129.2; 74/110

[56] References Cited

U.S. PATENT DOCUMENTS

| | | | |
|---|---|---|---|
| 3,046,802 | 7/1962 | Cupedo | 74/110 |
| 3,156,444 | 11/1964 | Black | 251/7 |
| 3,445,039 | 5/1969 | Brodsky et al. | 222/504 |
| 3,498,316 | 3/1970 | Pinder et al. | 251/7 |
| 3,707,845 | 1/1973 | Mitton | 74/110 |
| 3,788,177 | 1/1974 | Williamson | 74/110 |
| 3,881,641 | 5/1975 | Pliml, Jr. et al. | 222/214 |
| 4,487,333 | 12/1984 | Pounder et al. | 222/504 |
| 4,637,243 | 1/1987 | Bond | 74/110 |
| 4,804,118 | 2/1989 | Mullen et al. | 222/504 |
| 4,833,972 | 5/1989 | Bohusch et al. | 74/110 |

FOREIGN PATENT DOCUMENTS

| | | | |
|---|---|---|---|
| 75970 | 6/1959 | France | 251/7 |

*Primary Examiner*—Andres Kashnikow
*Assistant Examiner*—Jorge Bocanegra
*Attorney, Agent, or Firm*—Donald J. Ersler

[57] ABSTRACT

A beverage tapper shut-off mechanism includes a double acting solenoid, a locking mechanism, a dispensing tube, and a housing. The locking mechanism has a cam actuator, an upper thrust arm, a lower thrust arm, and a tube crusher. The lower thrust arm is pivotally connected to the tube crusher and the upper thrust arm. The double acting solenoid is fastened to the housing, and the upper thrust arm is pivotally connected to the housing. The cam actuator is fastened to an actuation rod of the double acting solenoid. The cam actuator has an internal cam surface which controls the movement of the tube crusher. A modified dispensing tube has two sides which are molded to be substantially squeezed together. The double acting solenoid is operated by a control circuit. When a particular amount of beverage is needed, a button is pushed on the operational circuit. A pulse of current is sent to the double acting solenoid. The double acting solenoid will actuate and pull the cam actuator upward which will cause the tube crusher to release pressure on the modified dispensing tube. When the operational circuit times out, the double acting solenoid will actuate and push the cam downward. The pivot point of the upper and lower thrust arms will be locked into place within the locking area of the cam actuator.

20 Claims, 4 Drawing Sheets

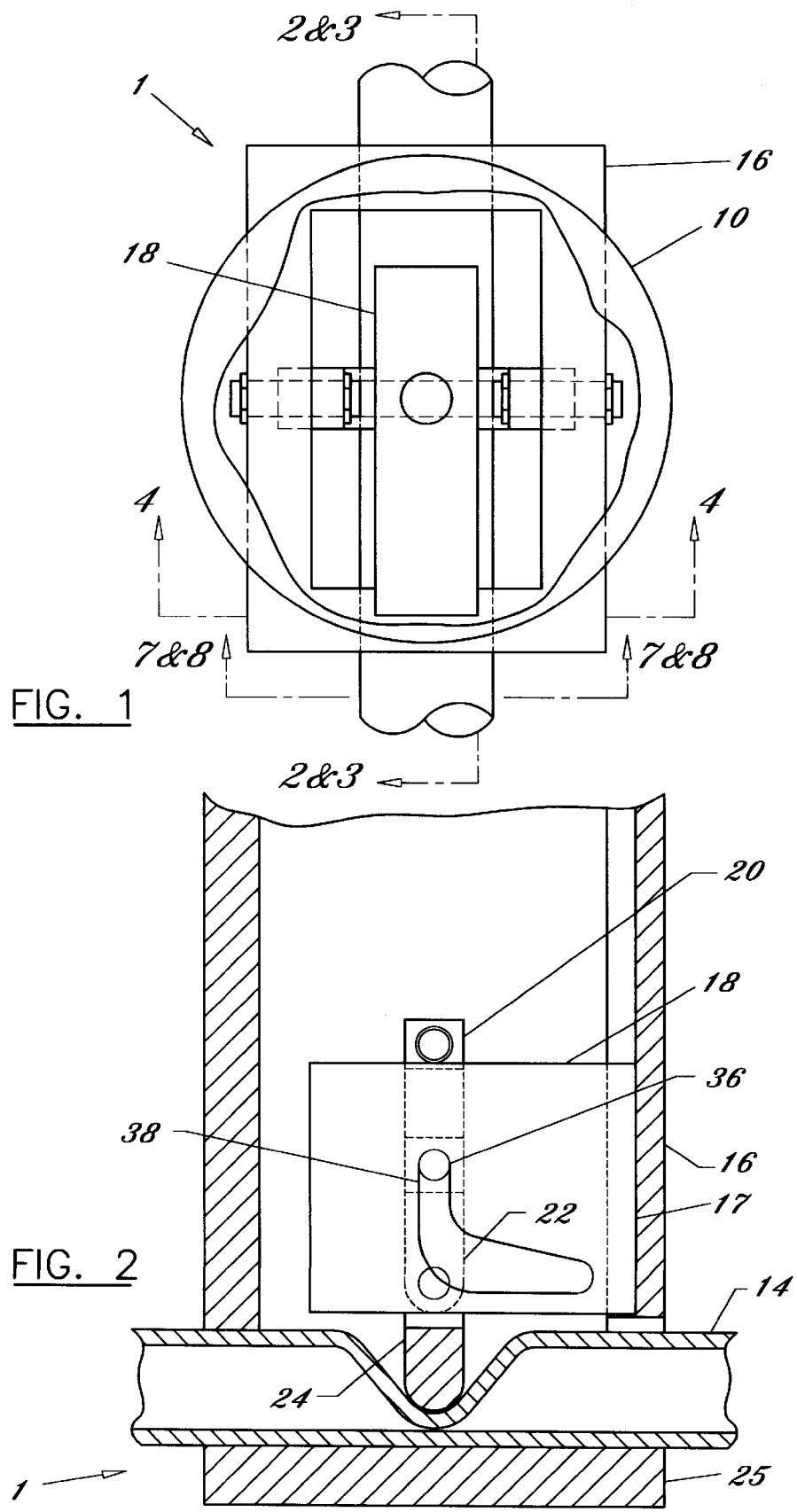

BEVERAGE TAPPER SHUT-OFF MECHANISM

BACKGROUND OF THE INVENTION

1. Field of the Invention

The present invention relates generally to beverage tappers and more specifically to a beverage tapper shut-off mechanism which provides an improved shutoff and control of a beverage being dispensed.

2. Discussion of the Prior Art

A problem frequently encountered with solenoid type beverage dispensers is a rise in line pressure which causes a closed dispensing tube to open and spew out beverage. Another problem with electrically operated tappers is that the solenoid must be energized for several seconds as the beverage is being poured. A solenoid which is energized for a long period of time requires a large amount of electrical power and could cause overheating if used for a prolonged period. The solenoid will also require a large power supply with a large current draw. The large current draws will contribute to an electricity shortage on extremely hot days in the summer when power plants are being run at maximum capacity.

Further, most dispensing tubes are round in shape and are crushed to stop the flow of a beverage. The crushing of a round tube induces stresses in the sides which results in premature failure.

Accordingly, there is a clearly felt need in the art for a beverage tapper shut-off mechanism which provides an improved shut-off for a dispensing tube, uses less energy, is safer, and is more reliable than that of the prior art.

SUMMARY OF THE INVENTION

The primary objective of the present invention is to provide a beverage tapper shut-off mechanism which provides an improved shut-off for a dispensing tube, uses less energy, is safer, and is more reliable than that of the prior art.

According to the present invention, a beverage tapper shut-off mechanism includes a double acting solenoid, a locking mechanism, a dispensing tube, and a housing. The locking mechanism has a cam actuator, an upper thrust arm, a lower thrust arm, and a tube crusher. An end of the upper thrust arm is pivotally connected to the housing. The other end of the upper thrust arm is pivotally connected to an end of the lower thrust arm.

The tube crusher is pivotally connected to the other end of the lower thrust arm and the tube crusher is guided by opposite sides of the housing. The tube crusher is also limited in stroke by the locking mechanism which decreases the tendency of the tube crusher to cut the dispensing tube. The double acting solenoid is firmly attached to the housing. The cam actuator is fastened to an actuation rod of the double acting solenoid. The cam actuator has a double acting internal cam surface which controls the movement of the tube crusher. The toggle action of the locking mechanism magnifies the closing force exerted against the dispensing tube when the upper and lower thrust arms are fully extended, yet lowers the cutting effect on the dispensing tube, because the fully extended upper and lower thrust arms do not over travel like an actuated solenoid.

A modified dispensing tube is similar to a round dispensing tube with the addition of two sides which are molded to be substantially squeezed together.

The double acting solenoid is operated by a control circuit. The control circuit includes a transformer, a rectifier circuit, a switching circuit, and an operational circuit. AC voltage is stepped down by the transformer and converted into DC voltage by the rectifier circuit. The DC voltage is used to power the operational circuit, the switching circuit, and the solenoid. When a particular amount of beverage is needed, a button is pushed on the operational circuit which operates the switching circuit. A small pulse of current is sent through the switching circuit to the double acting solenoid. The double acting solenoid will actuate and pull the cam actuator upward which will cause the tube crusher to release pressure from the dispensing tube. When the operational circuit times out, the double acting solenoid will actuate and push the cam downward. The pivot point of the upper and lower thrust arms will cause the tube crusher and the crushed tube dispenser to be locked into place within the locking area of the cam actuator. The double acting solenoid is energized for only a fraction of a second for either opening or closing the dispensing tube. The switching circuit can also be operated manually.

Accordingly, it is an object of the present invention to provide a beverage tapper shut-off mechanism which improves the closing of a dispensing tube.

It is a further object of the present invention to provide a beverage tapper shut-off mechanism which is safer than that of the prior art.

It is yet a further object of the present invention to provide a beverage tapper shut-off mechanism which is more reliable than that of the prior art.

It is yet a further object of the present invention to provide a beverage tapper shut-off mechanism with a dispensing tube which is more reliable than that of the prior art.

It is yet a further object of the present invention to provide a beverage tapper shut-off mechanism with dispensing tube which reduces foaming of carbonated beverages since turbulence in the fluid flow is reduced.

It is yet a further object of the present invention to provide a beverage tapper shut-off mechanism with dispensing tube which opens more quickly than that of the prior art.

Finally, it is another object of the present invention to provide a beverage tapper shut-off mechanism which consumes less electrical energy in operation than that of the prior art.

These and additional objects, advantages, features and benefits of the present invention will become apparent from the following specification.

BRIEF DESCRIPTION OF THE DRAWINGS

FIG. 1 is a top view of a beverage tapper shut-off mechanism with section lines for FIGS. 2–4, 7, and 8 in accordance with the present invention;

FIG. 2 is a cross sectional view of a beverage tapper shut-off mechanism with the flow of a beverage restrained in accordance with the present invention;

DETAILED DESCRIPTION OF THE PREFERRED EMBODIMENTS

Figure 3:
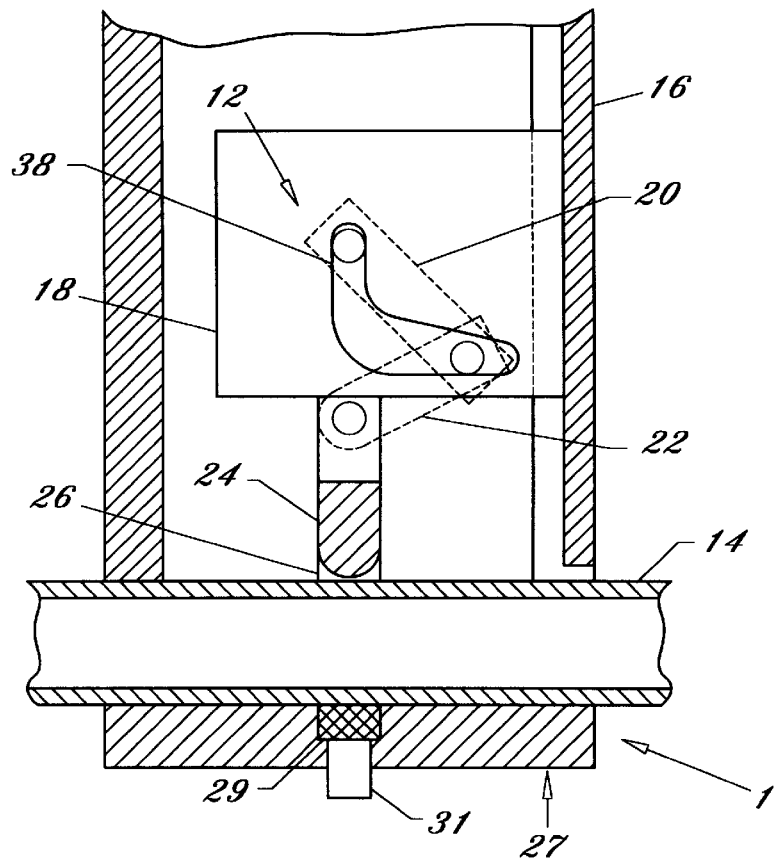
FIG. 3 is an axial cross sectional view of a beverage tapper shut-off mechanism with the flow of a beverage unrestrained in accordance with the present invention.
Figure 4:
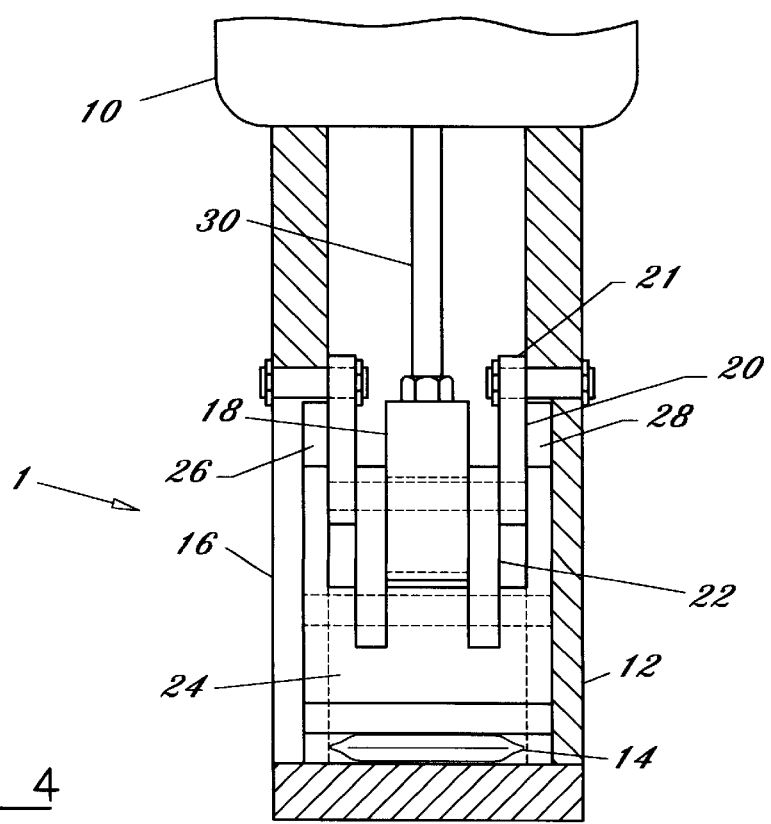
FIG. 4 is an end cross sectional view of a beverage tapper shut-off mechanism with the flow of a beverage restrained in accordance with the present invention.

With reference now to the drawings, and particularly to FIG. 1, there is shown a top view of a beverage tapper shut-off mechanism 1. With reference to FIGS. 2–4, the beverage tapper shut-off mechanism 1 includes a double acting solenoid 10, a locking mechanism 12, a dispensing tube, and a housing 16. The locking mechanism 12 has a cam actuator 18, at least one upper thrust arm 20, at least one lower thrust arm 22, and a tube crusher 24.

Figure 7:
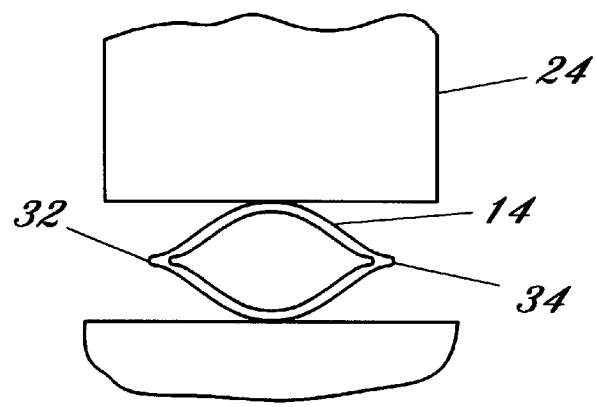
FIG. 7 is a cross sectional view of an open modified dispensing tube in accordance with the present invention.
Figure 8:
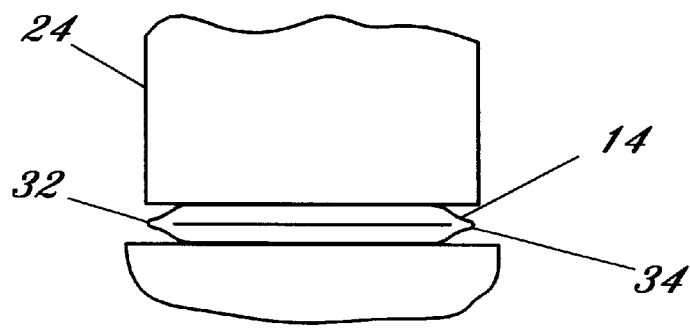
FIG. 8 is a cross sectional view of a closed modified dispensing tube in accordance with the present invention.

An end of the upper thrust arm 20 is pivotally connected to the housing 16. The other end of the upper thrust arm 20 is pivotally connected to an end of the lower thrust arm 22. The tube crusher 24 is pivotally connected to the other end of the lower thrust arm 22 and is guided by a first groove 26 and a second groove 28 disposed in the housing 16. The double acting solenoid 10 is firmly attached to the housing 16. The cam actuator 18 is fastened to an actuation rod 30 of the double acting solenoid 10. The cam actuator 18 has a double acting internal cam surface which controls the movement of the tube crusher 24. With reference to FIG. 7, a modified dispensing tube 14 has a cross section which is similar to a round dispensing tube. The modified dispensing tube 14 has a first compressed side 32 extending outward from the round portion and a second compressed side 34 which extends outward from the round portion substantially opposite the first compressed side 32. A round dispensing tube or the modified dispensing tube 14 may be used, however it is preferable that the modified dispensing tube 14 be used because of its superior performance over the round dispensing tube.

FIG. 2 shows a cross sectional view of the beverage tapper shut-off mechanism 1 with the flow of the modified tube dispensing 14 pinched-off. The double acting solenoid 10 is not energized continuously to pinch-off the modified tube dispensing 14. The double acting solenoid 10 is actuated downward into a closed position as shown. The modified tube dispensing 14 is kept closed by the locking action of the cam actuator 18 restraining the pivot point 36 of the upper thrust arm 20 and lower thrust arm 22 from motion. The cam actuator 18 is also supported by an inside wall 17 of the housing 16. The modified tube dispensing 14 is pinched between the tube crusher 24 and a tube support 25 which is disposed at the bottom of the housing 16.

It is preferable that the tube support 25 be a vertically adjustable tube support 27 as shown in FIG. 3 to compensate for different sizes of dispensing tubes. It is preferable that a moveable support member 29 be bolted against at least one set screw 31 which extends vertically from the housing. Adjustment of the set screw raises and lowers the vertical height of the moveable support member 29.

FIG. 3 shows a cross sectional view of the beverage tapper shut-off mechanism 1 with the modified dispensing tube 14 open. The double acting solenoid 10 is actuated upward into an open position as shown. The upward motion of the double acting solenoid 10 is sufficient to remove the pivot point 36 from the locking area 38 of the cam actuator 18. The double acting solenoid 10 is in an open position. The beverage is able to flow through the modified tube dispensing 14. It is preferable that the cam actuator 18 be guided in a groove disposed in the inside wall 17 of the housing 16 for stability of the locking mechanism 12.

Figure 5:
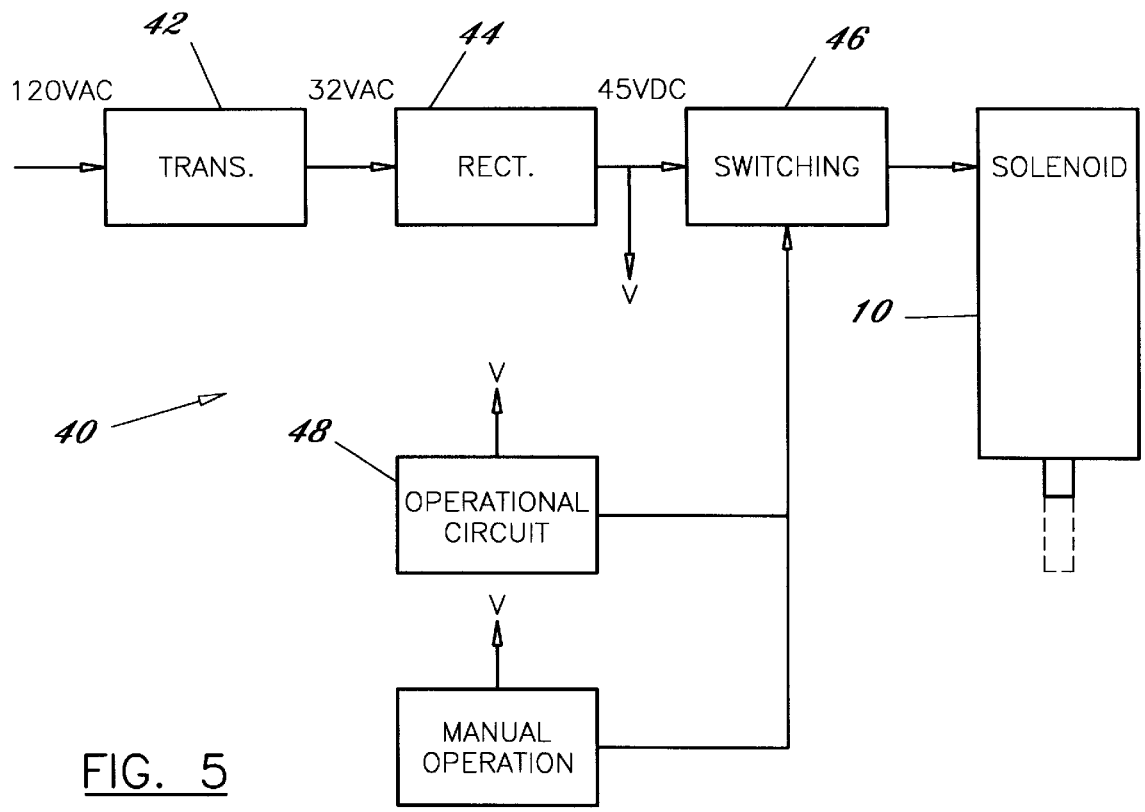
FIG. 5 is a block diagram of the control circuit in accordance with the present invention.

FIG. 5 shows a control circuit 40 which operates the double acting solenoid 10. The control circuit 40 includes a transformer 42, a rectifier circuit 44, a switching circuit 46, and an operational circuit 48. The following voltage values are given by way of example and not by way of limitation, other values of AC and DC voltage could be used. It is preferable that the voltage output be as low as possible for safety purposes. It is preferable that 120 volts AC is stepped down to 32 volts AC by the transformer 42. The 32 volts AC is rectified into 45 volts DC by the rectifier circuit 44. The 45 volts DC can be used to power the operational circuit 48 and the switching circuit 46. The switching circuit 46 preferably utilizes a pair of FET transistors for sending a small current pulse to actuate the double acting solenoid 10. The operational circuit 48 controls the timing when the double acting solenoid 10 is actuated and also controls the width of the small current pulse. The operational circuit is well known in the art as a microprocessor control board or the like. A plurality of buttons for different size cups are used to dispense a measured amount of beverage when pushed. The actuation of the double acting solenoid 10 can also be operated manually.

When a particular amount of beverage is needed, a particular button is pushed on the operational circuit 48. The transistor FETS act as a switch to allow a large DC current pulse to actuate the double acting solenoid 10. The double acting solenoid 10 will actuate upward and the cam actuator 18 will cause the tube crusher 24 to open the flow in the modified dispensing tube 14. When the operational circuit 48 times out, the double acting solenoid 10 will push the cam actuator 18 downward. The pivot point 36 of the upper thrust arm 20 and the lower thrust arm 22 will be locked into place with the locking area 38 of the cam actuator 18. The double acting solenoid 10 is energized for only a fraction of a second for either opening or closing the modified dispensing tube 14.

Figure 6:
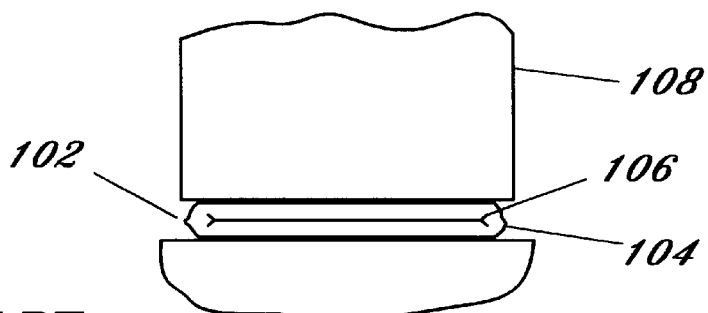
FIG. 6 is a cross sectional view of a prior art dispensing tube which has been shut-off.

FIG. 6 shows a cross sectional view of a prior art dispensing tube 102 which has been closed. The continued cycling of the tube crusher 108 will cause external cracks 104 and internal cracks 106 to form in the sides of the dispensing tube 102. This problem of the prior art dispensing tube 102 is solved by adding a first compressed side 32 and a second compressed side 34 to the sides of the dispensing tube. The addition of the first compressed side 32 and the second compressed side 34 to a dispensing tube results in a modified dispensing tube 14. Since the two sides are substantially compressed, no cracking results in the modified dispensing tube 14 at the sides from the continued cycling of the tube crusher 24.

Figure 9:
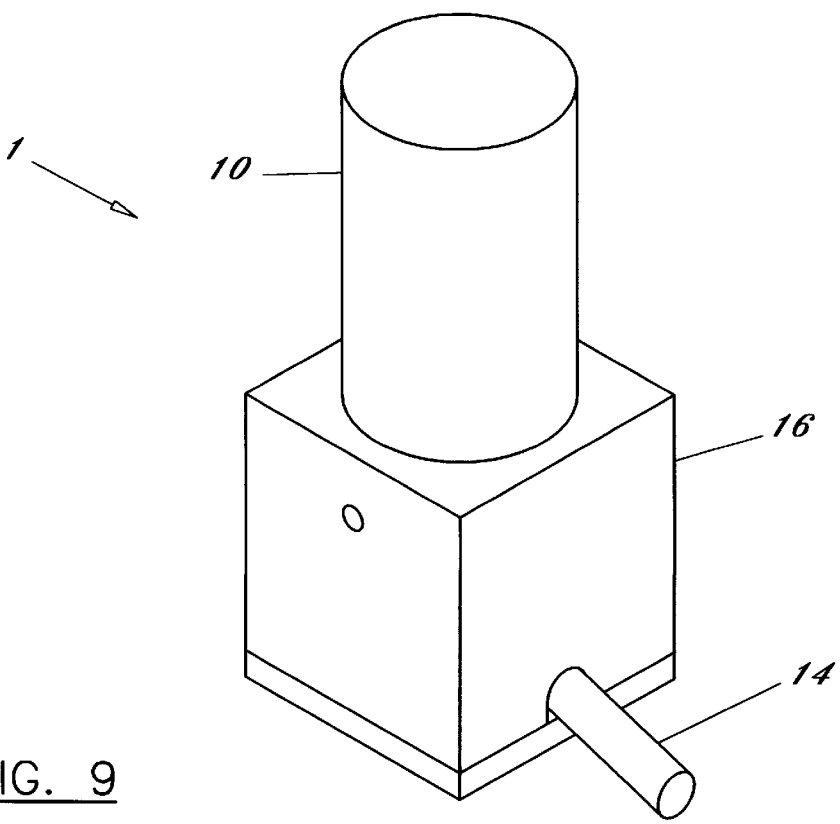
FIG. 9 is a perspective view of a beverage tapper shut-off assembly in accordance with the present invention.

FIG. 9 shows a perspective view of a beverage tapper shut-off mechanism 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. The beverage tapper shut-off mechanism is not to be limited to just dispensing beverages, but may be used to shut-off the flow of any type of liquid or fluid.

I claim:

1. A beverage dispensing shut-off mechanism comprising:

an upper thrust arm;

a lower thrust arm having one end which is pivotally connected to one end of said upper thrust arm; and a cam actuator having an internal cam surface, said internal cam surface including a locking area, said locking area restraining said upper and lower thrust arms from movement when said pivotal connection is disposed in said locking area, said cam actuator being axially guided.

2. The beverage dispensing shut-off mechanism of claim 1, further comprising:

a solenoid having actuation in at least one direction, one end of said solenoid being fastened to said cam actuator.

3. The beverage dispensing shut-off mechanism of claim 2, further comprising:

said solenoid having the other end fastened to a housing, the other end of said upper thrust arm being pivotally connected to said housing.

4. The beverage dispensing shut-off mechanism of claim 3, further comprising:

a tube crusher being pivotally connected to the other end of said lower thrust arm, said tube crusher being guided by a first groove and a second groove formed in said housing.

5. The beverage dispensing shut-off mechanism of claim 4, further comprising:

a dispensing tube being placed between said tube crusher and a support area of said housing, said tube crusher preventing the flow of a beverage through said dispensing tube when said double acting solenoid is in a closed position, said tube crusher allowing flow of a beverage through said dispensing tube when said double acting solenoid is in an open position.

6. The beverage dispensing shut-off mechanism of claim 5, further comprising:

said dispensing tube being a modified dispensing tube, said modified dispensing tube being substantially a round tube with a first compressed side extending outward from said round tube and a second compressed side extending outward from said round tube substantially opposite said first compressed side.

7. The beverage dispensing shut-off mechanism of claim 5, further comprising:

said support area being disposed on a bottom of said housing, said housing having means for vertical adjustment to compensate for varying sizes of dispensing tubes.

8. The beverage dispensing shut-off mechanism of claim 1, further comprising:

a switching circuit an operational circuit which controls said switching circuit, said switching circuit causing said solenoid to actuate, said operational circuit controlling the time when said double acting solenoid is actuated.

9. A beverage dispensing shut-off mechanism comprising:

an upper thrust arm;

a lower thrust arm having one end which is pivotally connected to one end of said upper thrust arm;

a tube crusher being pivotally connected to the other end of said lower thrust arm, said tube crusher being guided within said housing;

a cam actuator having an internal cam surface, said internal cam surface including a locking area, said locking area restraining said upper and lower thrust arms from movement when said pivotal connection is disposed in said locking area;

a double acting solenoid having an actuation rod, said actuation rod being securely fastened to said cam actuator; and a dispensing tube being placed between said tube crusher and a support area of said housing, said tube crusher preventing the flow of a beverage through said dispensing tube when said double acting solenoid is in a closed position, said tube crusher allowing flow of a beverage through said dispensing tube when said double acting solenoid is in an open position.

10. The beverage dispensing shut-off mechanism of claim 9, further comprising:

said double acting solenoid being fastened to a housing, the other end of said upper thrust arm being pivotally connected to said housing.

11. The beverage dispensing shut-off mechanism of claim 9, wherein:

said cam actuator being guided by a groove formed in an inside wall of said housing.

12. The beverage dispensing shut-off mechanism of claim 9, further comprising:

said dispensing tube being a modified dispensing tube, said modified dispensing tube being substantially a round tube with a first compressed side extending outward from said round tube and a second compressed side extending outward from said round tube substantially opposite said first compressed side.

13. The beverage dispensing shut-off mechanism of claim 9, further comprising:

said support area being disposed on a bottom of said housing, said housing having means for vertical adjustment to compensate for varying sizes of dispensing tubes.

14. The beverage dispensing shut-off mechanism of claim 9, further comprising:

a switching circuit an operational circuit which controls said switching circuit, said switching circuit causing said double acting solenoid to actuate, said operational circuit controlling the time when said double acting solenoid is actuated.

15. A beverage dispensing shut-off mechanism comprising:

an upper thrust arm;

a lower thrust arm having an end which is pivotally connected to an end of said upper thrust arm;

a tube crusher being connected to the other end of said lower thrust arm;

a cam actuator having an internal cam surface, said internal cam surface including a locking area, said locking area restraining said upper and lower thrust arms from movement when said pivotal connection is disposed in said locking area without having to maintain axial force against said cam actuator in either direction, said cam actuator being axially guided; and a dispensing tube being placed between said tube crusher and a support area, said tube crusher preventing the flow of a beverage through said dispensing tube when said pivotal connection is disposed in said locking area.

16. The beverage dispensing shut-off mechanism of claim 15, further comprising:

a double acting solenoid having one end which is fastened to said cam actuator.

17. The beverage dispensing shut-off mechanism of claim 16, further comprising:

said double acting solenoid having the other end fastened to a housing, the other end of said upper thrust arm being pivotally connected to said housing.

18. The beverage dispensing shut-off mechanism of claim 15, further comprising:

said dispensing tube being a modified dispensing tube, said modified dispensing tube being substantially a round tube with a first compressed side extending outward from said round tube and a second compressed side extending outward from said round tube substantially opposite said first compressed side.

19. The beverage dispensing shut-off mechanism of claim 15, further comprising:

said support area being disposed on a bottom of a housing, said housing having means for vertical adjustment to compensate for varying sizes of dispensing tubes.

20. The beverage dispensing shut-off mechanism of claim 15, further comprising:

a switching circuit an operational circuit which controls said switching circuit, said switching circuit causing said double acting solenoid to actuate, said operational circuit controlling the time when said double acting solenoid is actuated.

* * * * *